(12) United States Patent
Ishii et al.

(10) Patent No.: US 9,902,450 B2
(45) Date of Patent: Feb. 27, 2018

(54) MOTORCYCLE

(71) Applicant: Kawasaki Jukogyo Kabushiki Kaisha, Kobe-shi, Hyogo (JP)

(72) Inventors: Hiroshi Ishii, Kobe (JP); Tomo Yamamoto, Kobe (JP); Daisuke Saeki, Kakogawa (JP)

(73) Assignee: Kawasaki Jukogyo Kabushiki Kaisha, Kobe-shi, Hyogo (JP)

( * ) Notice: Subject to any disclaimer, the term of this patent is extended or adjusted under 35 U.S.C. 154(b) by 0 days.

(21) Appl. No.: 15/101,302

(22) PCT Filed: Dec. 6, 2013

(86) PCT No.: PCT/JP2013/007201
§ 371 (c)(1),
(2) Date: Jun. 2, 2016

(87) PCT Pub. No.: WO2015/083206
PCT Pub. Date: Jun. 11, 2015

(65) Prior Publication Data
US 2017/0001674 A1    Jan. 5, 2017

(51) Int. Cl.
*B62J 6/02* (2006.01)
*B62J 17/02* (2006.01)
(Continued)

(52) U.S. Cl.
CPC .................. *B62J 6/02* (2013.01); *B62J 17/02* (2013.01); *B62J 99/00* (2013.01); *B62J 2099/004* (2013.01); *B62K 11/04* (2013.01)

(58) Field of Classification Search
CPC ........ B62J 6/02; B62J 17/02; B62J 2099/004; B62K 11/04
See application file for complete search history.

(56) References Cited

U.S. PATENT DOCUMENTS 5,952,729 A * 9/1999 Shiratori ............... B60R 16/005
307/9.1
7,680,564 B2 * 3/2010 Kawamura ................ B62J 6/18
307/10.1
(Continued)

FOREIGN PATENT DOCUMENTS

JP     S59162378 U1    10/1984
JP     H07025341 B      3/1995
(Continued)

OTHER PUBLICATIONS

ISA Japanese Patent Office, International Search Report Issued in Application No. PCT/JP2013/007201, dated Mar. 4, 2014, WIPO, 4 pages.
(Continued)

*Primary Examiner* — Joseph M Rocca
*Assistant Examiner* — Michael R Stabley
(74) *Attorney, Agent, or Firm* — Alleman Hall Creasman & Tuttle LLP

(57) ABSTRACT

A motorcycle comprises a vehicle body, a front cowling, and an ECU. A head lamp unit is placed at the front end portion of the vehicle body. The front cowling is provided at the front end portion of the vehicle body to cover the head lamp unit. The ECU is placed adjacently to the head lamp unit on the right side of the head lamp unit. The ECU is located between the front cowling and the head lamp unit.

17 Claims, 6 Drawing Sheets

(51) Int. Cl.
*B62J 99/00* (2009.01)
*B62K 11/04* (2006.01)

(56) References Cited

U.S. PATENT DOCUMENTS

| | | | |
|---|---|---|---|
| 2013/0002418 A1* | 1/2013 | Nakamura | B60K 35/00 |
| | | | 340/441 |
| 2013/0307411 A1* | 11/2013 | Tsuchiya | B60Q 1/2696 |
| | | | 315/77 |
| 2015/0015019 A1* | 1/2015 | Matsuoka | B62J 17/00 |
| | | | 296/84.1 |

FOREIGN PATENT DOCUMENTS

| | | | |
|---|---|---|---|
| JP | 2001071961 A | 3/2001 | |
| JP | 2008080868 A | 4/2008 | |
| JP | 2012176755 A | 9/2012 | |
| JP | 2013067339 A | 4/2013 | |
| JP | 2013129282 A | 7/2013 | |
| JP | 2013193594 A | 9/2013 | |
| JP | 2014210443 A | 11/2014 | |
| WO | 2012070169 A1 | 5/2012 | |
| WO | 2012120947 A1 | 9/2012 | |

OTHER PUBLICATIONS

ISA Japan Patent Office, Written Opinion of the International Searching Authority Issued in Application No. PCT/JP2013/007201, dated Mar. 4, 2014, WIPO, 6 pages.

* cited by examiner

MOTORCYCLE

TECHNICAL FIELD

The present invention relates to a motorcycle including electric components.

BACKGROUND ART

A motorcycle includes electric components such as an electronic control unit (ECU) and relays. The electric components are placed in the vicinity of the center of the vehicle body of the motorcycle, in a forward and rearward direction, namely, in the vicinity of an engine. For example, in a motorcycle disclosed in Patent Literature 1, an ECU accommodating section is provided below a rider seat, and the ECU is accommodated in this ECU accommodating section.

CITATION LIST

Patent Literature

Patent Literature 1: Japanese Laid-Open Patent Application Publication No. 2001-071961

SUMMARY OF INVENTION

Technical Problem

A region which is in the vicinity of the engine and below the rider seat tends to be affected by the vibration or radiation heat of the engine. For this reason, the durability of the ECU tends to be reduced. In the engine and the region which is in the vicinity of the engine, an ignition device and a variety of rotary members such as a crankshaft are placed. While the ignition device is performing spark discharge and the rotary members are rotating, electromagnetic noise is generated. The ECU is affected by the electromagnetic noise generated from the ignition device, the rotary members, and others. To suppress the effects of the electromagnetic noise, it becomes necessary to protect the ECU from electromagnetic waves.

Accordingly, an object of the present invention is to provide a motorcycle which can suppress the effects of the electromagnetic noise and heat on the electric components.

Solution to Problem

A motorcycle of the present invention comprises a vehicle body provided with a head lamp unit placed at a front end portion thereof; a front cowling provided at the front end portion of the vehicle body to cover the head lamp unit; and an electric component placed adjacently to the head lamp unit in a direction perpendicular to a forward and rearward direction and located between the front cowling and the head lamp unit.

In accordance with the present invention, the electric component can be placed at the front end portion of the vehicle body. In this layout, the electric component can be located to be distant from the engine. This makes it possible to suppress the effects of the electromagnetic noise or heat radiated from the engine, on the electric component.

In the above invention, the front cowling may have a shape in which a dimension in a vehicle width direction increases as the front cowling extends in a rearward direction from the head lamp unit, and a front end of the electric component may be located rearward relative to a front end of the head lamp unit and in front of a rear end of the head lamp unit.

In accordance with this configuration, since the front cowling has a shape in which the dimension in the vehicle width direction increases as the front cowling extends in the rearward direction, a gap can be easily formed between the vehicle body and the front cowling. In the gap formed between the vehicle body and the front cowling, the electric component can be easily placed.

In the above invention, the electric component may be placed at a location that is outward in a vehicle width direction relative to the head lamp unit.

A space formed at the location that is outward in the vehicle width direction relative to the head lamp unit is easily accessible before the front cowling is mounted to the vehicle body. In accordance with the above-described configuration, the electric component is easily placed in the space formed at the location that is outward in the vehicle width direction relative to the head lamp unit.

In the above invention, the electric component may be provided with a wire on a rear surface thereof, and the wire may extend rearward from the rear surface of the electric component.

In accordance with the above-described configuration, since the wire extends rearward from the electric component, it becomes possible to suppress interference between the wire and the front cowling covering the front end portion of the vehicle body.

In the above invention, the electric component may have a flat shape, and a primary surface of the electric component may face an inner peripheral surface of the front cowling.

In accordance with the above-described configuration, a layout in which the electric component is laid down to extend in the vehicle width direction (in a horizontal direction), does not take place. Therefore, the electric component can be placed in a narrow space formed between the front cowling and the vehicle body.

In the above invention, the electric component may be mounted to the vehicle body via a bracket, and the bracket may be placed in such a manner that a gap is formed between the electric component and the head lamp unit.

In accordance with the above-described configuration, the gap can be formed between the head lamp unit and the electric component. This makes it possible to prevent the heat of the head lamp unit from being directly transferred to the electric component. The electric component can be cooled by the air flowing through the gap. In this way, an increase in the temperature of the electric component can be suppressed.

In the above invention, the head lamp unit may include: a light source which emits light; and a convex lens which diffuses and radiates the light emitted from the light source.

In accordance with the above-described configuration, the size of the head lamp unit can be reduced by use of the convex lens. As a result, the space in which the electric component is placed and which is formed in the vicinity of the head lamp unit can be made greater than in a conventional example.

In the above invention, the light source may be a light emitting diode.

In accordance with the above-described configuration, the amount of heat generated in the light source can be reduced, and a temperature increase in the electric component can be suppressed.

In the above invention, the head lamp unit may be a head lamp unit of a single light type, including a single lamp located at a center of the vehicle body in a vehicle width direction, or a head lamp unit including a plurality of lamps arranged vertically at the center of the vehicle body in the vehicle width direction.

In accordance with the above-described configuration, the spaces formed on the both sides of the head lamp unit in the vehicle width direction to place the electric components therein can be made greater than those in a conventional configuration.

In the above invention, the electric component may be part of a plurality of electric components, and the plurality of electric components may be placed on both sides, respectively, in a vehicle width direction, with respect to the head lamp unit.

In accordance with the above-described configuration, the plurality of electric components can be placed at the front end portion of the vehicle body.

In the above invention, the motorcycle may comprise an electromagnetic noise generating source which generates an electromagnetic noise, and the electric component may be placed on an opposite side of the electromagnetic noise generating source in a vehicle width direction, with respect to the head lamp unit.

In accordance with the above-described configuration, since the electric component is placed on an opposite side of the electromagnetic noise generating source in the vehicle width direction, with respect to the head lamp unit, the effects of the electromagnetic noise generated from the electromagnetic noise generating source on the electric component can be suppressed.

Advantageous Effects of Invention

In accordance with the present invention, it becomes possible to suppress the effects of electromagnetic noise and heat on the electric components.

DESCRIPTION OF EMBODIMENTS

Hereinafter, a motorcycle 1 of Embodiment 1 of the present invention will be described with reference to the drawings. The directions stated below are intended for easier understanding of the description and the directions or the like of the constituents of the present invention are not limited to the stated directions. Further, the motorcycle 1 which will be described below is merely one embodiment of the present invention. Therefore, the present invention is not limited to the embodiment described below, and the configuration of the present invention can be changed, added to or subtracted from, within a scope of the spirit of the present invention.

[Motorcycle]

Figure 1:
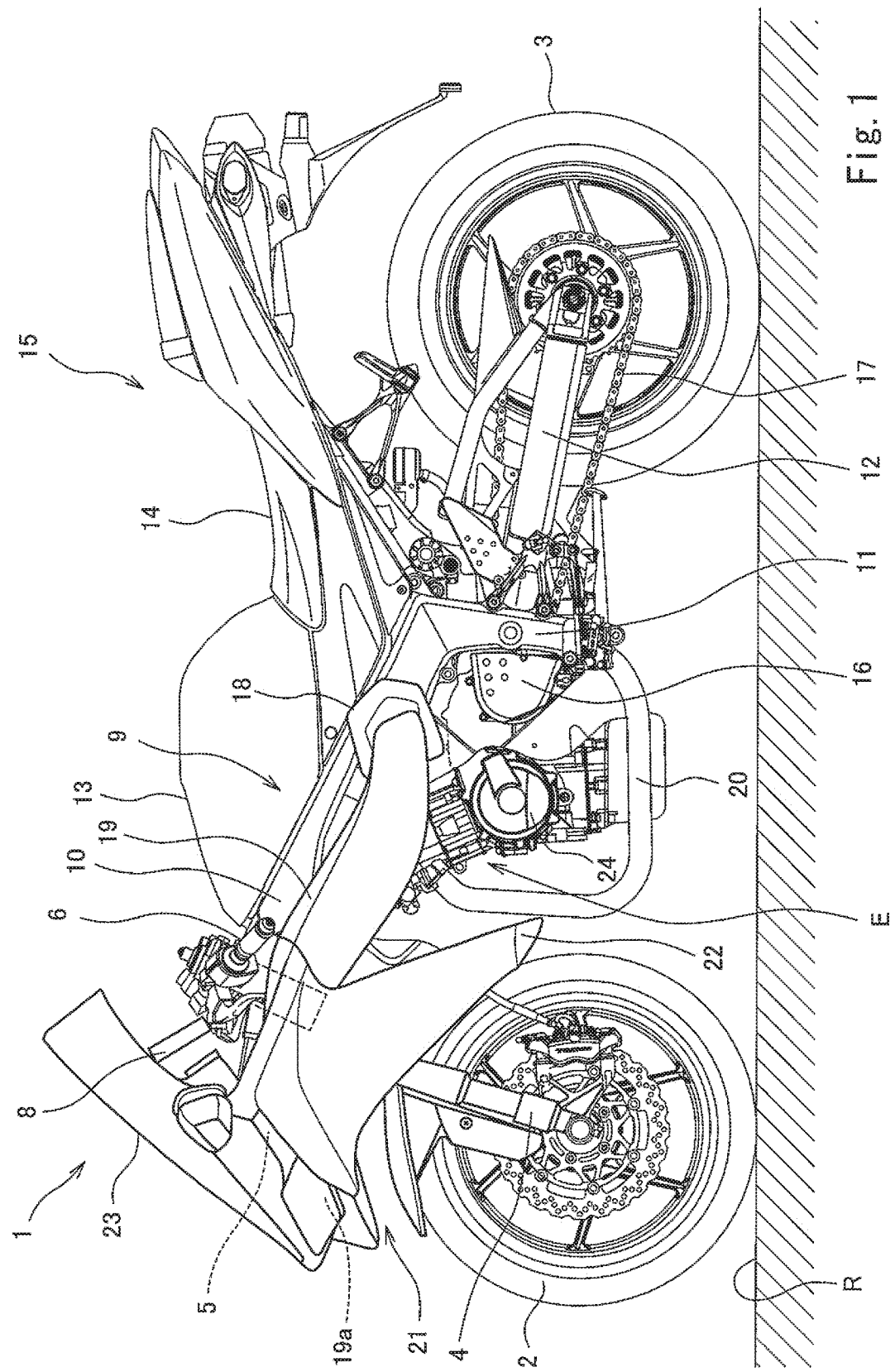
FIG. 1 is a left side view of a motorcycle according to the embodiment of the present invention.

As shown in FIG. 1, the motorcycle 1 of the present invention includes a front wheel 2 and a rear wheel 3 which roll on a road surface R. The front wheel 2 is rotatably mounted to the lower end portions of front forks 4 extending substantially vertically. The front forks 4 are supported on a steering shaft (not shown) via an upper bracket (not shown) and an under bracket (not shown) which are provided at the upper end portions of the front forks 4 to be vertically spaced apart from each other. The steering shaft is rotatably supported by a head pipe 5 (see FIG. 3). A bar-type handle 6 extending in a rightward and leftward direction is attached to the upper bracket.

Grips which are to be gripped by the rider's right and left hands are attached to the right and left end portions of the handle 6. A throttle grip 7 (see FIG. 2) to be gripped by the right hand is rotatable with respect to the handle 6. The rider grips the right and left grips 7 and rotates the handle 6 to change the direction of the front wheel 2 in a desired direction around the steering shaft.

In front of the upper bracket, meters 8 which display the engine speed of an engine E which will be described later, a vehicle speed, etc., are placed. A pair of right and left main frames 10 are mounted to the head pipe 5 in such a manner that the main frames 10 are integrated with the head pipe 5. The pair of right and left main frames 10 extend rearward from the head pipe 5 in such a manner that the main frames 10 are slightly inclined in a downward direction. A pair of right and left pivot frames 11 are connected to the rear portions of the main frames 10, respectively. The front end portions of a swing arm 12 extending substantially in a forward and rearward direction are mounted to the pivot frames 11 in such a manner that the swing arm 12 is pivotable. The rear wheel 3 is rotatably mounted to the rear end portion of the swing arm 12. A fuel tank 13 is placed rearward relative to the handle 6. A seat 14 straddled by the rider is placed behind the fuel tank 13. In the above-described manner, a vehicle body 15 is capable of traveling by the front wheel 2 and the rear wheel 3.

The vehicle body 15 includes the in-line four cylinder engine E between the front wheel 2 and the rear wheel 3. The engine E is incorporated into the vehicle body 15 in such a manner that the engine E is mounted to the main frames 10 and the pivot frames 11. The engine E includes, on an upper portion thereof, intake ports and exhaust ports (not shown). A throttle device (not shown) is connected to the intake ports. The throttle device is placed rearward relative to the upper portion of the engine E. An air cleaner 18 is placed rearward relative to the throttle device. The air cleaner 18 is connected to the throttle device and an air-intake duct 19. The air-intake duct 19 extends from the air cleaner 18 to the front end of the vehicle body 15 through a left lateral region of the engine E. The tip end of the air-intake duct 19 opens at the front end of the vehicle body 15 to form a suction port 19a. The air-intake duct 19 takes in air through the suction port 19a. This air is supplied to the throttle device.

The throttle device is provided in a passage connecting the air cleaner 18 to the intake ports of the engine E. The throttle device is configured to adjust the opening degree of the passage so that the opening degree corresponds to the rotation amount of the throttle grip 7. The air flows through the air cleaner 18 and then is supplied to the intake ports of the engine E via the throttle device. The throttle device is provided with an injector which is not shown. The injector injects fuel to be mixed with compressed air flowing from the throttle device to the intake ports of the engine E. An exhaust pipe 20 is connected to the exhaust ports (not shown) of the engine E in such a manner that the exhaust pipe 20 extends from the front portion of the engine E to a right region of the rear wheel 3 through a region that is under the engine E. The terminal end of the exhaust pipe 20 is provided with a muffler (not shown). The muffler contains a catalyst therein.

In the engine E configured as described above, an air-fuel mixture is combusted in the ignition device (not shown), a piston is moved, and a crankshaft (not shown) is rotated. A transmission 16 which will be described later and a generator 24 are mounted to the crankshaft. The generator 24 is a three-phase AC power generator. According to the rotation of the crankshaft, the generator 24 generates AC power. The generator 24 is mounted to the left end portion of the crankshaft to convert the rotational force of the crankshaft into the AC power. The generator 24 is placed on the left side of the vehicle body 15. The generator 24 is electrically connected to a regulator 25. The regulator 25 is mounted to the inner peripheral surface of a front cowling 21 which will be described later. The regulator 25 is placed on the left side of the vehicle body 15. The regulator 25 rectifies the AC power generated in the generator 24 into DC power and adjusts the voltage of this DC power at a constant value. The generator 24 and the regulator 25 are placed on the same side of the vehicle body 15 in the vehicle width direction. This layout can shorten a wire connecting the generator 24 to the regulator 25.

A transmission 16 is connected to the crankshaft to transmit the rotational power of the crankshaft to the rear wheel 3. The transmission 16 is capable of selecting a transmission gear position by using a shift pedal which is not shown. The transmission 16 reduces the rotational power of the crankshaft in a reduction gear ratio of the selected transmission gear position, and outputs the rotational power. Driving power output from the transmission 16 is transmitted to the rear wheel 3 via a chain 17, and thereby the rear wheel 3 is rotated. According to the rotation of the rear wheel 3, the vehicle body 15 travels in a forward direction.

Figure 2:
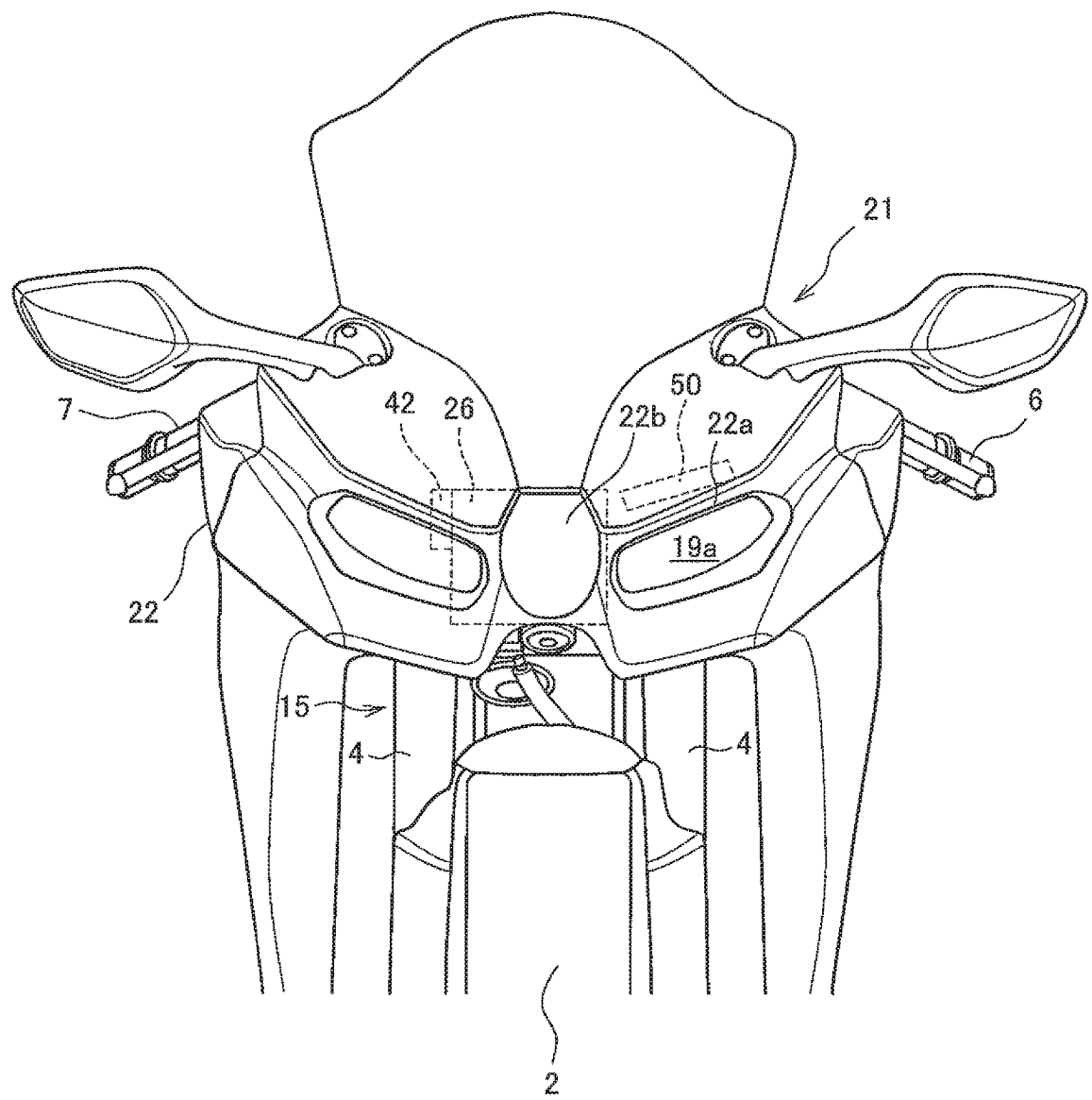
FIG. 2 is a front view of the motorcycle of FIG. 1.

The motorcycle 1 includes the front cowling 21 shown in FIG. 2. The front cowling 21 serves to reduce air resistance while the motorcycle 1 is traveling, and shield the rider from wind. The front cowling 21 includes a cowling body 22 and a wind shield 23. The cowling body 22 extends in a rearward direction from the front end of the vehicle body 15. The cowling body 22 has an outer shape in which its outer edge extends in an outward direction of the vehicle width direction as it extends in the rearward direction. The cowling body 22 is inclined in a downward direction, from its front end toward a rear portion, as a whole. The upper surface of the front portion of the cowling body 22 is inclined in an upward direction as it extends in the rearward direction. The cowling body 22 extends from the front end of the vehicle body 15 to a location that is rearward relative to a radiator which is not shown, and covers a portion of the vehicle body from the front end to the region that is rearward relative to the radiator, from the right and left sides. The cowling body 22 is fastened to a frame 9 comprising the head pipe 5 and the main frames 10. The regulator 25 is mounted to the left inner peripheral surface of the cowling body 22 (see FIG. 3). The wind shield 23 is mounted to the upper portion of the tip end portion (namely, front end portion) of the cowling body 22. An air-intake hole 22a and a lamp hole 22b are placed below the wind shield 23.

The air-intake hole 22a and the lamp hole 22b are provided on the tip end portion of the cowling body 22. The air-intake hole 22a is located on the left side of the cowling body 22 in the vehicle width direction. The air-intake hole 22a penetrates the cowling body 22. The suction port 19a of the air-intake duct 19 is connected to the air-intake hole 22a. On the right side of the air-intake hole 22a, the lamp hole 22b is located at the center of the cowling body 22 in the vehicle width direction. The lamp hole 22b penetrates the cowling body 22. The head lamp unit 26 is placed behind the lamp hole 22b.

The head lamp unit 26 is a lamp of a single light projection lens type. The head lamp unit 26 includes a light source and a lens. In the present embodiment, a light emitting diode (LED) is used as the light source. The lens is placed in front of the light source. This lens is a projection lens (convex lens). The lens refracts light output from the light source and emits the light to a proper emission range.

The head lamp unit 26 is configured in such a manner that the light source and the lens are covered by a unit cover, and is provided at the front end portion of the vehicle body 15. In more detail, the head lamp unit 26 is placed so that the light whose emission range has been magnified by the lens is emitted through the lamp hole 22b. A forward region is irradiated with this light. The head lamp unit 26 is placed inside the cowling body 22 at a location that is rearward relative to the lamp hole 22b and is in front of the meters 8. The head lamp unit 26 is mounted to the frame 9. The head lamp unit 26 is unmovable with respect to the cowling body 22 even in a state in which the handle 6 is operated. This makes it possible to prevent the movement of a wire (not shown) connected to the head lamp unit 26, which may take place due to the operation of the handle 6. The electronic control unit (ECU) 42 is mounted to the right side surface of the head lamp unit 26 via a bracket 41.

Figure 5:
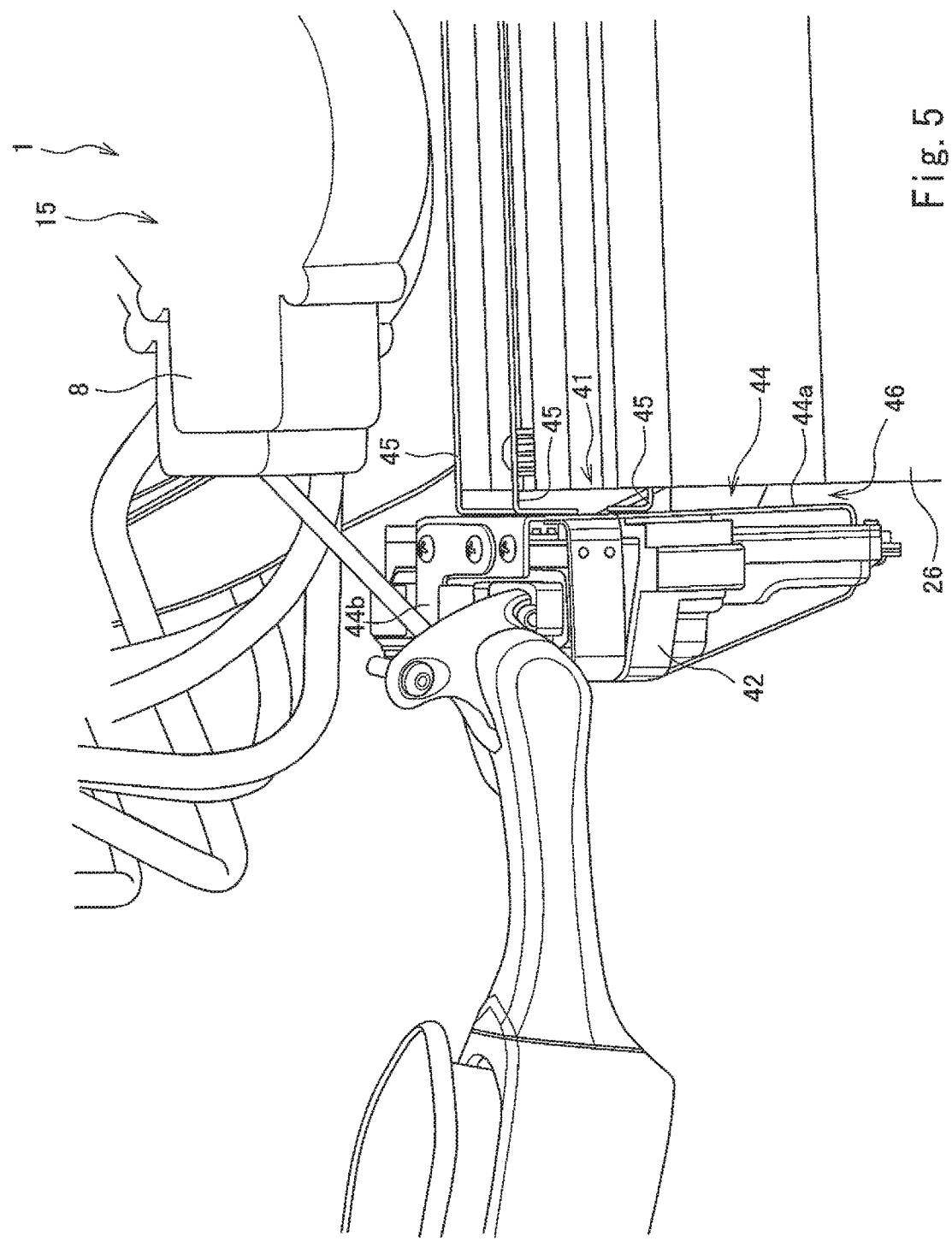
FIG. 5 is an enlarged view showing a region which is in the vicinity of an ECU of the motorcycle of FIG. 3.

The ECU 42 which is one of the electric components is configured to control the operations of the electric devices such as the injector and the ignition device. The ECU 42 has a substantially flat shape (e.g., a rectangular parallelepiped plate shape). A plurality of wires 43 are connected to the rear (back) surface of the ECU 42. The wires 43 are connected to the various electric devices including the injector and the ignition device. The ECU 42 is electrically connected to the variety of electric components via the wires 43. As shown in FIG. 5, the ECU 42 is mounted to the head lamp unit 26 via a bracket 41.

The bracket 41 includes a bracket body 44 and a plurality of leg members 45. The bracket body 44 includes a placement section 44a and a cover section 44b. The placement section 44a has a substantially plate shape and is provided with a plurality of punch holes. The ECU 42 is placed on the obverse surface of the placement section 44a in a state in which one of the surfaces of the ECU 42 in the thickness direction is in contact with the obverse surface of the placement section 44a. The cover section 44b is provided to cover the ECU 42. The cover section 44b covers the other surface of the ECU 42 in the thickness direction. The cover section 44b is fastened to the placement section 44a and thereby the cover section 44b and the placement section 44a retain the ECU 42 in a state in which the ECU 42 is sandwiched between the placement section 44a and the cover section 44b. On the reverse surface of the placement section 44a, the plurality of leg members 45 are attached. The leg members 45 extend vertically on the reverse surface of the placement section 44a, and their tip end portions are fastened to the head lamp unit 26.

The ECU 42 fastened in the above-described manner is located adjacently to the head lamp unit 26 on the right side of the head lamp unit 26 and mounted to the head lamp unit 26 via the bracket 41. In this layout, the ECU 42 can be placed to be distant from the engine E. Therefore, the ECU 42 is less affected by the electromagnetic noise or heat radiated from the engine E. The generator 24 and the regulator 25, which generate the electromagnetic noise, are mounted to the left inner peripheral surface of the cowling body 22, while the ECU 42 is mounted to the right side of the head lamp unit 26. In other words, the ECU 42 is placed on an opposite side of the generator 24 and the regulator 25 in the vehicle width direction, with respect to the head lamp unit 26. This makes it possible to suppress the effects of the electromagnetic noise generated in the generator 24 and the regulator 25 on the ECU 42.

Figure 6:
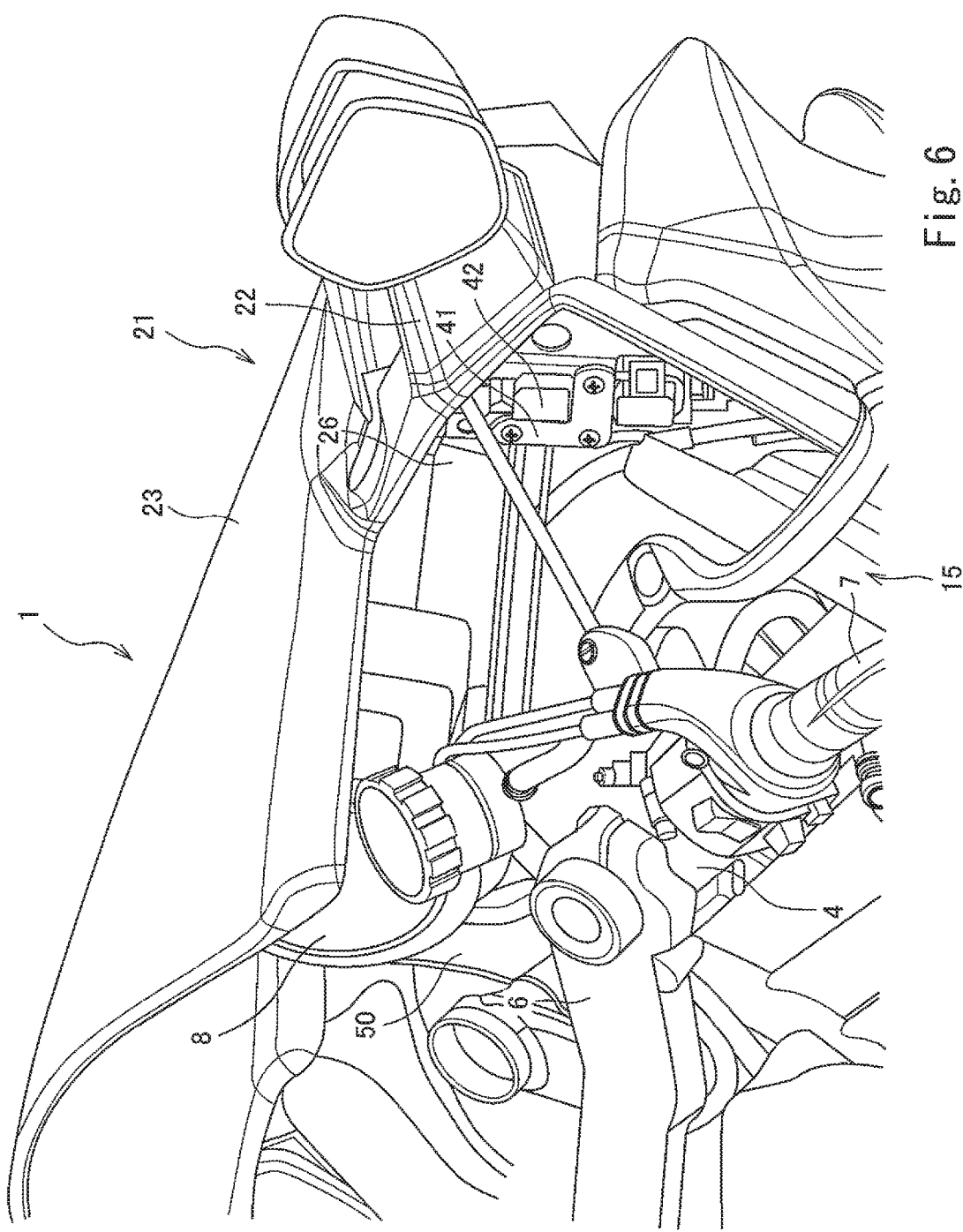
FIG. 6 is a perspective view showing the front portion of the motorcycle of FIG. 1, when viewed from the rear.

As shown in FIG. 6, the ECU 42 is placed between the cowling body 22 and the head lamp unit 26 in a state in which the other surface (primary surface) in the thickness direction faces the inner peripheral surface of the cowling body 22. In this layout, the bracket 41 is mounted to the head lamp unit 26 in such a manner that the ECU 42 is inclined in an obliquely downward direction, and the front end portion of the ECU 42 is made lower than the rear end portion of the ECU 42. Thus, a layout in which the ECU 42 is laid down and extends in the vehicle width direction does not take place. Therefore, the ECU 42 can be placed in a narrow space formed between the cowling body 22 and lamp unit 26. The rear surface of the ECU 42 to which the wires 43 are connected faces the rear so that the wires 43 extend in the rearward direction from the ECU 42.

Figure 3:
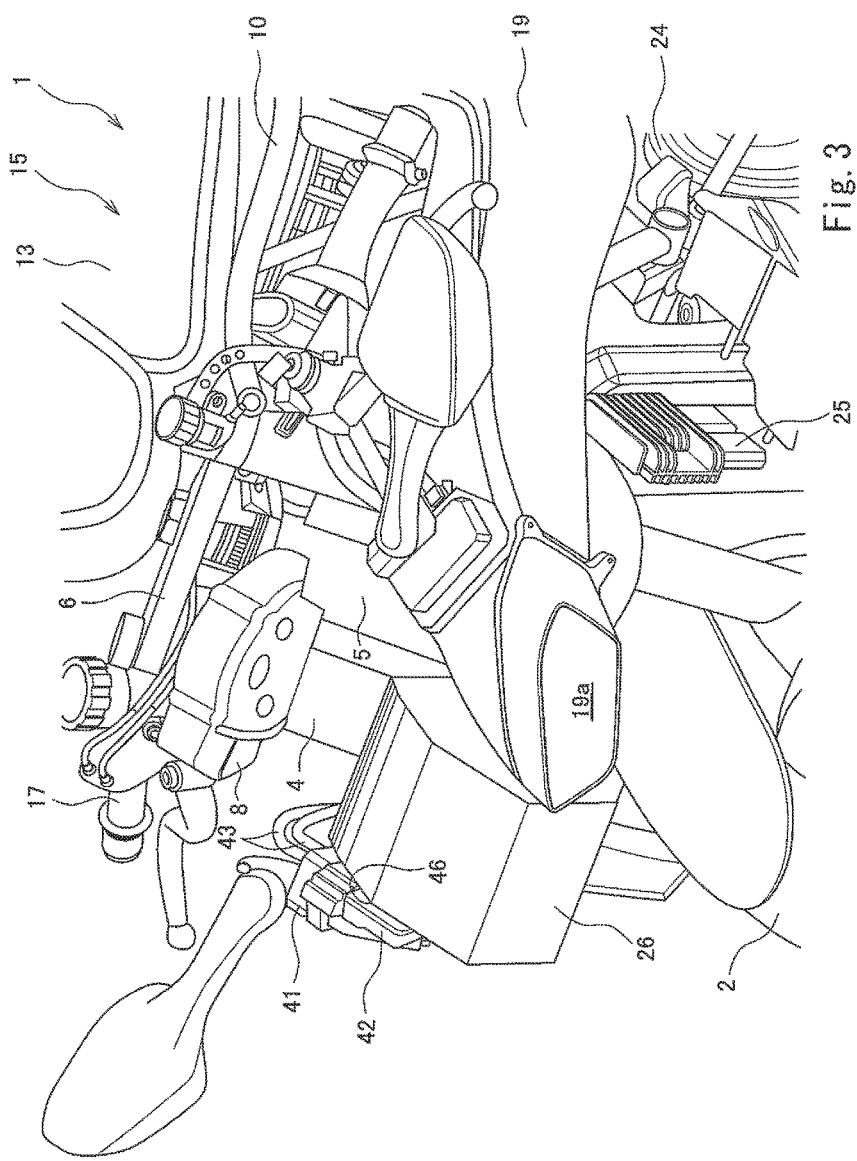
FIG. 3 is a perspective view of the motorcycle of FIG. 1, when viewed from the left and obliquely from the front, in a state in which a front cowling is detached from a vehicle body.
Figure 4:
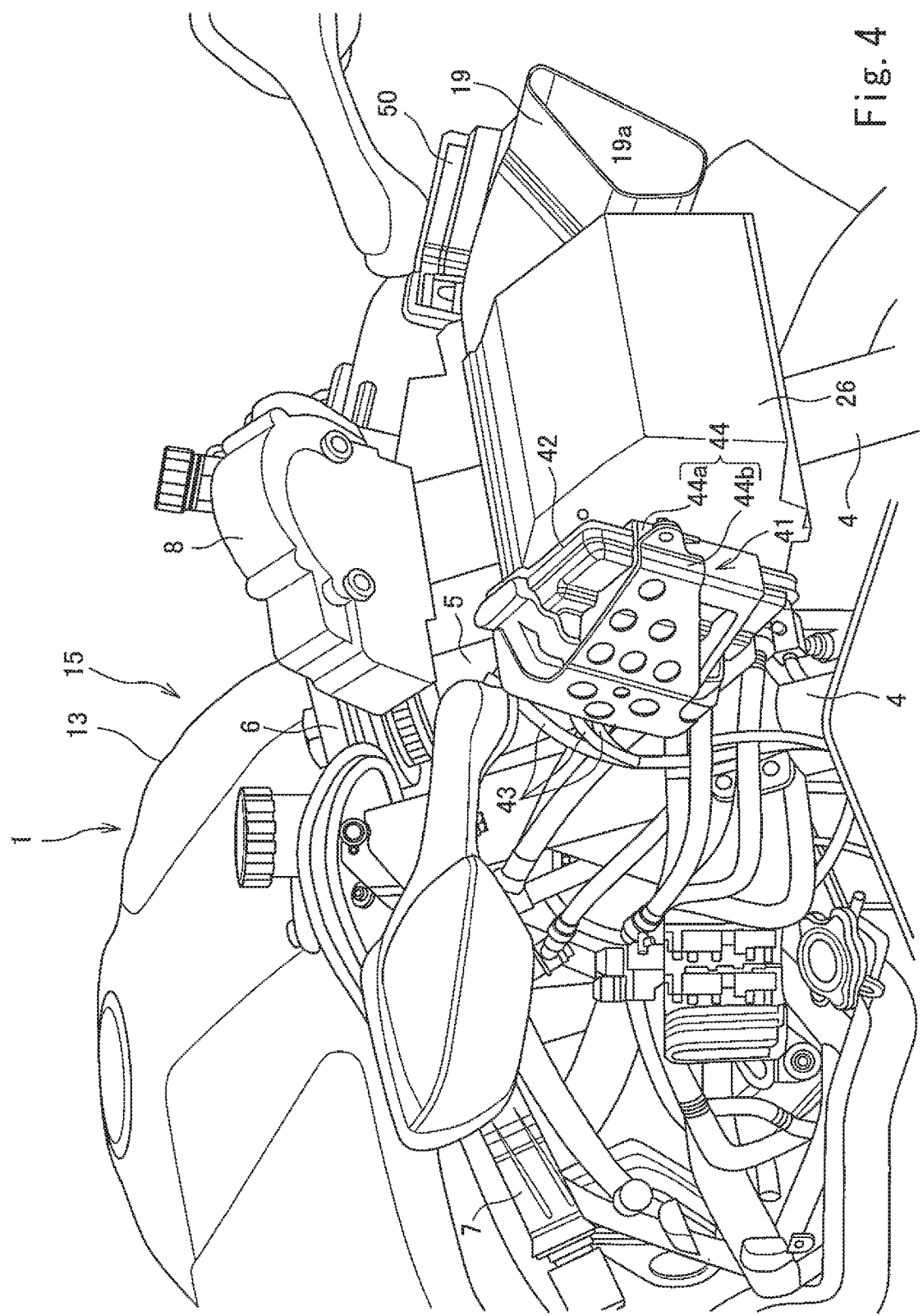
FIG. 4 is a perspective view of the motorcycle of FIG. 3, when viewed from the right and obliquely from the front.

The placement section 44a of the bracket 41 is spaced apart from the head lamp unit 26 by the leg members 45. A gap 46 is formed between the placement section 44a and the head lamp unit 26. In this way, the gap 46 exists between the ECU 42 and the head lamp unit 26. This makes it possible to prevent the heat of the head lamp unit 26 from being directly transferred to the ECU 42. The ECU 42 can be cooled by the air flowing through the gap 46. In this way, an increase in the temperature of the ECU 42 can be suppressed. Further, since the ECU 42 is mounted to the head lamp unit 26 via the bracket 41, the size of the bracket 41 can be reduced, compared to a case where the ECU 42 is mounted to the vehicle body 15 via the bracket 41. As described above, the ECU 42 is placed on the right side of the head lamp unit 26, while the tip end portion of the air-intake duct 19 is placed on the left side of the head lamp unit 26. As shown in FIGS. 3 and 4, a relay box 50 is placed on the upper surface of the tip end portion of the air-intake duct 19.

The relay box 50 which is one of the electric components is a box including a variety of switching elements and a plurality of relays which perform switching between a continuity state and a cut-off state, of a current flowing through the electric devices such as the head lamp unit 26 and a cell motor, in response to commands from the ECU 42. The relay box 50 has a substantially flat plate shape. The size of the outer shape of the relay box 50 is smaller than that of the ECU 42. For this reason, the relay box 50 can be placed between the head lamp unit 26 and the cowling body 22 in such a manner that the relay box 50 is located adjacently to the head lamp unit 26, in a space which is on the left side of the head lamp unit 26 and is relatively narrow because of the presence of the air-intake duct 19. The relay box 50 is placed in such a manner that its bottom surface which is one of the surfaces in the thickness direction is in contact with the upper surface of the air-intake duct 19. The relay box 50 is cooled by the air flowing through the air-intake duct 19. In this way, an increase in the temperature of the relay box 50 can be prevented.

Wires (not shown) connected to the switching elements and the ECU 42 are connected to the relay box 50. The wires extend rearward from the rear surface of the relay box 50. In this layout, it becomes possible to prevent interference between the wires and the cowling body 22 covering the relay box 50 from the front.

In the motorcycle 1 of the present embodiment, the electric components such as the relay box 50 and the ECU 42, and the head lamp unit 26 are fastened to the vehicle body 15. Irrespective of whether or not a handle operation (steering operation) is performed, the postures (positions and inclinations) of the electric components and the head lamp unit 26, with respect to the vehicle body 15, are not changed. This makes it possible to suppress the deformation of a harness including the wires 43 attached to the electric components, which would be caused by the handle operation.

Control targets such as the ignition device and the injector which are to be controlled by the ECU 42 are placed at a relatively front side of the engine E. In view of this, by placing the ECU 42 at a location that is lateral to the head lamp unit 26, a distance between the ECU 42 and the control targets can be made shorter, compared to a case where the ECU 42 is placed below the seat 14. In this layout, connection wires connecting the ECU 42 to the control targets can be shortened.

In the motorcycle 1 of the present embodiment, the ECU 42 and the relay box 50 are placed at locations that are outward in the vehicle width direction relative to the head lamp unit 26. The dimensions of the spaces formed between the head lamp unit 26 and the cowling body 22, at the locations that are outward in the vehicle width direction relative to the head lamp unit 26, are greater than that of a space formed above the head lamp unit 26 and that of a space formed below the head lamp unit 26 are. Since the ECU 42 and the relay box 50 are placed at the locations that are outward in the vehicle width direction relative to the head lamp unit 26, a space in which the wires 43 of the ECU 42 are placed and a space in which the wires of the relay box 50 are placed can be increased. In this way, it becomes possible to prevent both sets of wires from interfering with the head lamp unit 26 and the cowling body 22.

The upper surface of the front portion of the cowling body 22 is inclined in an upward direction as it extends in a rearward direction. The ECU 42 has a flat shape. The ECU 42 is placed in such a manner that the thickness direction of the ECU 42 is parallel to the vehicle width direction. Since the ECU 42 is inclined in the upward direction as it extends in the rearward direction, the upper surface of the ECU 42 can be placed in close proximity to the upper surface of the front portion of the cowling body 22.

Before the front cowling 21 is mounted to the vehicle body 15, the spaces formed above and below the head lamp unit 26 are not easily accessible, when the electric components such as the ECU 42 and the relay box 50 are mounted. This is because the meters 8 and the front wheel 2 are located above and below the head lamp unit 26. In contrast, the spaces formed at the locations that are outward in the vehicle width direction relative to the head lamp unit 26 are more easily accessible than the spaces formed above and below the head lamp unit 26 are. For this reason, the ECU 42 and the relay box 50 are easily placed in the spaces formed at the locations that are outward in the vehicle width direction relative to the head lamp unit 26.

Since the cowling body 22 extends in the outward direction of the vehicle width direction as it extends in the rearward direction, the spaces can be easily formed between the cowling body 22 and the vehicle body 15. In such a space, the electric components such as the ECU 42 and the relay box 50 are easily placed.

In the motorcycle 1, since the projection lens which is the convex lens is used as the lens, the size of the head lamp unit 26 can be reduced, and the spaces in which the electric components such as the ECU 42 and the relay box 50 are placed can be formed in the vicinity of the head lamp unit 26. Further, since the LED is used as the light source of the head lamp unit 26, the amount of heat generated in the light source can be reduced, and hence temperature increases in the ECU 42 and the relay box 50 which are adjacent to the head lamp unit 26 can be suppressed.

Since the head lamp unit 26 uses the head lamp unit of the single light type, the length of the head lamp unit 26 in the vehicle width direction can be shortened. As a result, it becomes possible to form the spaces in which the electric components such as the ECU 42 and the relay box 50 are placed, on both sides (right and left sides) of the head lamp unit 26 in the vehicle width direction.

Since the spaces are formed on both sides of the head lamp unit 26 in the vehicle width direction, the ECU 42 and the relay box 50 can be placed on both sides in the vehicle width direction, with respect to the head lamp unit 26. In this way, the plurality of electric components can be placed at the front end portion of the vehicle body 15.

The electric components such as the ECU 42 and the relay box 50 are placed at the front end portion of the vehicle body 15, or to be precise, in front of the front forks 4. Since the electric components such as the ECU 42 and the relay box 50 are placed at the front end portion of the vehicle body 15, a load at the front side of the vehicle body 15 can be increased. As a result, the rider can steer the motorcycle 1 more easily.

Since the ECU 42 is placed between the head lamp unit 26 and the cowling body 22, it is difficult to detach the ECU 42 from outside the front cowling 21. This can prevent theft of the ECU 42 more effectively. Since the ECU 42 is covered by the cowling body 22, there is no need for a cover covering the ECU 42. As a result, the number of members can be reduced.

A main harness via which a communication is made according to a controller area network (CAN) communication standard is connected to the ECU 42. The main harness includes the plurality of wires 43 which are bundled. The wires 43 branch from the main harness and are connected to the devices. The main harness is placed on an opposite side of the ECU 42 in the vehicle width direction with respect to the vehicle body 15, namely, on the left side. Since the main harness is placed on the opposite side of the ECU 42, interference between the main harness and the ECU 42 can be prevented.

Other Embodiment

Although in the motorcycle 1 of the present embodiment, the head lamp unit 26 of the single light type is used, a head lamp unit including a plurality of lamps arranged vertically at the center of the vehicle body 15 in the vehicle width direction may be used. Although the relay box 50 is placed on the left side of the head lamp unit 26 and the ECU 42 is placed on the right side of the head lamp unit 26, this positional relationship in the rightward and leftward direction may be reversed. Further, the relay box 50 and the ECU 42 may be placed only on one of the right and left sides of the head lamp unit 26. Moreover, one of the relay box 50 and the ECU 42 may be placed beside the head lamp unit 26.

Although in the motorcycle 1 of the present embodiment, the handle 6 is not provided with a steering damper, the handle 6 may be provided with the steering damper. The steering damper serves to apply a resistance force to the steering operation for rotating the handle 6. The steering damper is capable of varying the resistance force in such a manner that the resistance force is made different between high-speed traveling and low-speed traveling. A steering ECU is electrically connected to the steering damper. The steering ECU which is one of the electric components is capable of controlling the resistance force of the steering damper. The steering ECU (electric component) having such a function is placed adjacently to the head lamp unit 26, at a location that is obliquely below the head lamp unit 26. A variety of control devices, such as an ECU of an ABS unit, an ECU of the meters 8, etc., as well as the steering ECU, may be used as the electric components. Further, devices other than the control devices, such as the relays and the regulator, may be used as the electric components.

Although the head lamp unit 26 comprises the LED head lamp including a reflector, the head lamp unit 26 may comprise an LED head lamp of a direct emission type including no reflector. In this case, because of the absence of the reflector, the space saving of the head lamp unit 26 can be realized, and the space for the electric component can be increased. The light source of the head lamp unit 26 is not limited to the LED head lamp, and may be a head lamp of a valve type.

Although in the motorcycle 1 of the present embodiment, the air-intake duct 19 extends through the lateral region of the engine E, this is merely exemplary. Although the motorcycle 1 of the present embodiment includes the engine E, an electric motorcycle which drives the drive wheel 3 by an electric motor may be used.

Further, the motorcycle 1 may include an ABS unit. The ABS unit is located in front of the engine E, and fastened to the main frame 10 at a location that is close to the head pipe 5. Since the ECU 42 is placed at the location that is lateral relative to the head lamp unit 26, the ECU 42 can be made close to the meters 8 and the ABS unit. This makes it possible to shorten the wires extending from the ECU 42 to the meters 8 and the ABS unit. The ABS unit is placed on the right side (the side where a rear wheel brake disc is placed and an opposite side of a driving power transmission mechanism such as the chain 17) with respect to the center of the vehicle body 15 in the vehicle width direction. In this layout, a brake pipe connecting the ABS unit to the rear wheel brake mechanism can be shortened. Further, the ABS unit may be placed on the side where the master cylinder of the front wheel 2 or the master cylinder of the rear wheel 3 is placed. As described above, since the ABS unit is preferably located to be close to the ECU 42, the ECU 42 is also preferably placed on the right side (the side where the rear wheel brake disc and the rear wheel master cylinder are placed), with respect to the center of the vehicle body 15 in the vehicle width direction.

In the motorcycle 1 of the present embodiment, the air which has flowed through the air cleaner 18 is supplied to the engine E. Alternatively, a supercharger which supercharges the air may be placed between the air cleaner 18 and the engine E. In a case where the supercharger is provided, the supercharger and a chamber which is provided between the supercharger and the intake-ports and stores the supercharged air therein, are located in the vicinity of the engine E, and the number of the members placed in the vicinity of the engine E is increased. For this reason, the configuration of the present invention in which the ECU 42 is placed in the vicinity of the head lamp unit 26 is effectively used in the motorcycle including the supercharger. Further, the motorcycle 1 may include an electric throttle valve device which is electrically connected to the ECU 42 and whose air-intake amount is adjustable by the ECU 42. Also, in this case, the number of the members placed in the vicinity of the engine E is increased. Therefore, the present invention is effectively used in the motorcycle including the electric throttle valve device.

LIST OF REFERENCE CHARACTERS

1 motorcycle
15 vehicle body
21 front cowling
25 regulator
26 head lamp unit
41 bracket
42 ECU
43 wire
46 gap
50 relay box

The invention claimed is:

1. A motorcycle comprising:
a vehicle body provided with a head lamp unit placed at a front end portion thereof;
a front cowling provided at the front end portion of the vehicle body to cover the head lamp unit; and
an electric component placed adjacently to the head lamp unit in a direction perpendicular to a forward and rearward direction and located between the front cowling and the head lamp unit,
wherein the vehicle body is provided with a generator and a regulator, and
wherein the electric component is placed on an opposite side of the generator and the regulator in a vehicle width direction with respect to the head lamp unit.

2. The motorcycle according to claim 1,
wherein the front cowling has a shape in which a dimension in the vehicle width direction increases as the front cowling extends in a rearward direction from the head lamp unit, and
wherein a front end of the electric component is located rearward relative to a front end of the head lamp unit and in front of a rear end of the head lamp unit.

3. The motorcycle according to claim 1,
wherein the electric component is placed at a location that is outward in the vehicle width direction relative to the head lamp unit.

4. The motorcycle according to claim 1,
wherein the electric component is provided with a wire on a rear surface thereof, and
wherein the wire extends rearward from the rear surface of the electric component.

5. The motorcycle according to claim 1,
wherein the electric component has a flat shape, and a primary surface of the electric component faces an inner peripheral surface of the front cowling.

6. The motorcycle according to claim 1,
wherein the electric component is mounted to the vehicle body via a bracket, and
wherein the bracket is placed in such a manner that a gap is formed between the electric component and the head lamp unit.

7. The motorcycle according to claim 1,
wherein the head lamp unit includes:
a light source which emits light; and
a convex lens which diffuses and radiates the light emitted from the light source.

8. The motorcycle according to claim 7,
wherein the light source is a light emitting diode.

9. The motorcycle according to claim 1,
wherein the head lamp unit is a head lamp unit of a single light type, including a single lamp located at a center of the vehicle body in the vehicle width direction, or a head lamp unit including a plurality of lamps arranged vertically at the center of the vehicle body in the vehicle width direction.

10. The motorcycle according to claim 1,
wherein the electric component is an electronic control unit which electronically controls a control target.

11. The motorcycle according to claim 10,
wherein the control target is an injector, a steering damper, an ABS unit, or a meter.

12. The motorcycle according to claim 1,
wherein the vehicle body includes a vehicle body frame, and
wherein the head lamp unit and the electric component are fastened to the vehicle body frame, and
wherein the electric component is placed outward in the vehicle width direction relative to the head lamp unit.

13. The motorcycle according to claim 1,
wherein the electric component has a flat shape, and
wherein a surface of the electric component in a thickness direction thereof is placed in close proximity to the head lamp unit.

14. The motorcycle according to claim 1,
wherein the electric component has a flat shape, and
wherein a surface of the electric component in a thickness direction thereof is placed in close proximity to an air-intake duct.

15. The motorcycle according to claim 1,
wherein the electric component has a flat shape, and
wherein the electric component is placed in such a manner that a thickness direction of the electric component is parallel to the vehicle width direction.

16. The motorcycle according to claim 1,
wherein the electric component controls an electronic device other than the head lamp unit.

17. The motorcycle according to claim 1,
wherein a harness via which communication is made according to a controller area network (CAN) communication standard is connected to the electric component.

* * * * *